Aug. 1, 1950
W. H. ARMISTEAD
2,517,459
OPTICAL GLASS
Filed May 27, 1946
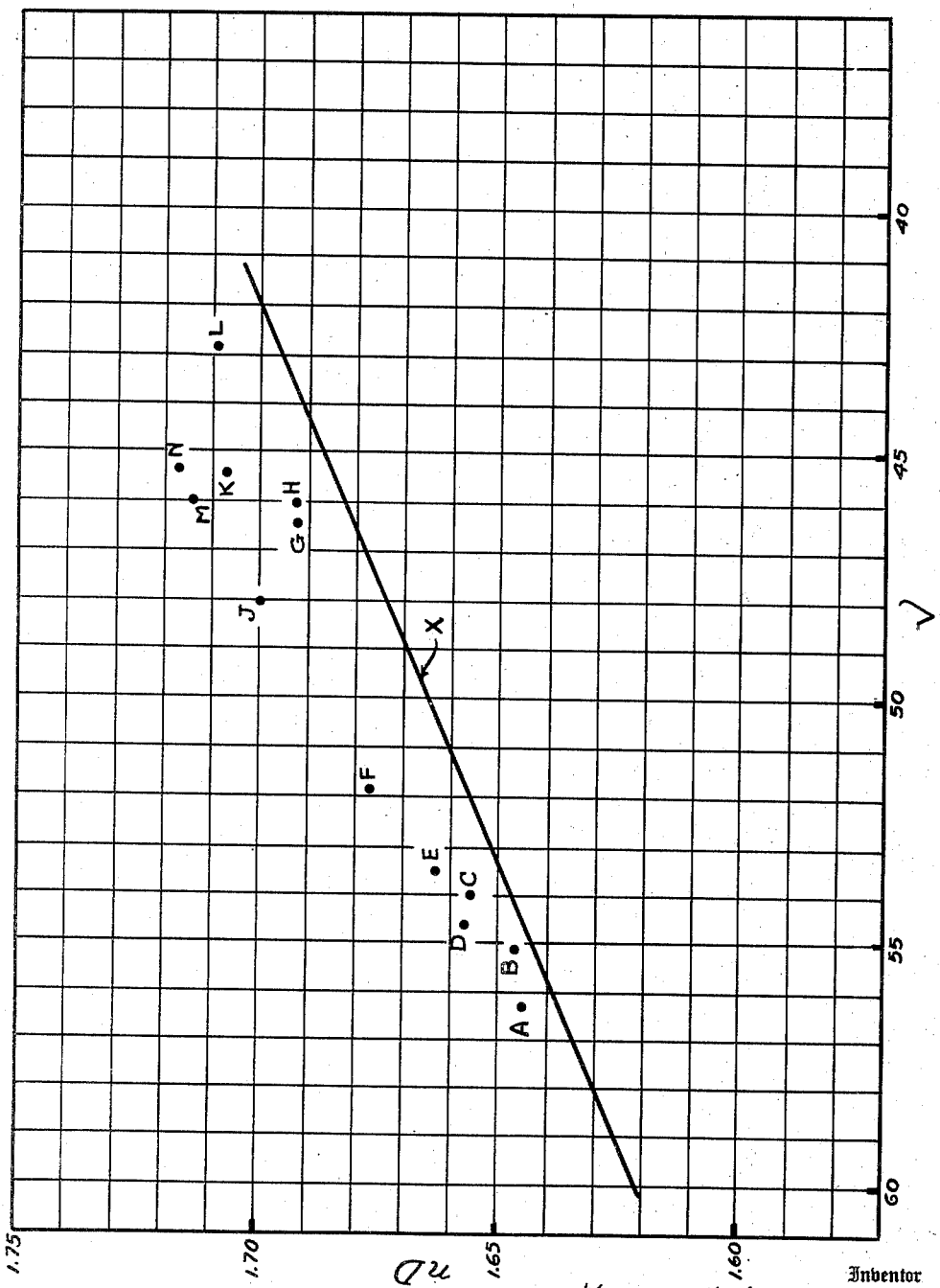
Inventor
WILLIAM H. ARMISTEAD
By Knight & Fowler
Attorneys Patented Aug. 1, 1950

2,517,459

UNITED STATES PATENT OFFICE 2,517,459

OPTICAL GLASS

William H. Armistead, Corning, N. Y., assignor to Corning Glass Works, Corning, N. Y., a corporation of New York Application May 27, 1946, Serial No. 672,587

11 Claims. (Cl. 106—53)

This application is a continuation in part of my pending application Serial Number 614,288 filed September 4, 1945, and issued February 17, 1948, as Patent 2,435,905, which discloses and claims cadmium-containing optical glasses having a high refractive index for the D line ($nD$) and a high dispersive index ($\nu$). The latter value, known as the nu value, expresses the effective refractivity of the glass ($nD-1$) in terms of its mean dispersion ($nF-nC$). Its reciprocal ($1/\nu$) is a measure of the dispersive power of the glass. In other words, the higher the nu value the lower the dispersive power.

For the correction of chromatic aberration in optical systems of the type known as anomalous achromats and to eliminate secondary spectrum therefrom, it is desirable to combine a glass (flint) having a low $nD$ with a glass (crown) having a higher $nD$, preferably at least .13 higher than that of the flint glass, the nu values of the two glasses being of the same order of magnitude and preferably that of the crown exceeding that of the flint. Prior crown glasses made from cheap or easily available materials do not have as great a superiority in $nD$ as is desired.

The primary object of this invention is to provide transparent optical glasses of high chemical durability and resistance to devitrification which have refractive indices for the D line greater than $nD=1.635$ and which are suitable for combination in anomalous achromats with glasses of substantially the same nu value but at least .13 lower in refractive index ($nD$) than the former.

Another object is to provide such glasses having refractive indices for the D line greater than $nD=1.67$.

Another object is to make such glasses of cheap or easily available materials.

Glasses having these desirable optical properties have been made from relatively large amounts of rare or expensive oxides, including principally oxides of lanthanum and of metals of the fourth and fifth periodic groups. I have discovered that such glasses can be made from the more common glass making materials, silica, boric oxide and the alkaline earths. I have found that the oxides of beryllium, calcium and strontium are particularly effective for increasing the refractive index of glass without substantially increasing its dispersive power and that these oxides are more compatible in relatively large amounts in borosilicate glasses than hitherto was supposed. Moreover, the resulting glasses have very good chemical stability.

The new glasses contain 5% to 40% $SiO_2$, 5% to 40% $B_2O_3$, 2% to 15% BeO and 10% to 60% of either CaO or SrO or both, the total divalent oxides being between 55% and 80% and have a refractive index greater than $nD=1.635$.

In order to have a refractive index above 1.67 the glasses should preferably contain 10% to 20% $SiO_2$, 10% to 20% $B_2O_3$, 3% to 8% BeO, 10% to 60% of either CaO or SrO or both and 3% to 8% $ZrO_2$, the total divalent oxides being between 57% and 77%.

For the present purposes, only those divalent oxides are suitable which do not color glass and they consist of lead oxide and the oxides of the metals of the second periodic group, BeO, MgO, CaO, ZnO, SrO, CdO and BaO.

The compositions of the new glasses can be varied within the ranges set forth above, subject to the following considerations. Maximum solubility of BeO, about 15%, occurs when the percentage of CaO and SrO is about 20% to 30% and the total amount of divalent oxides is about 55%. With lower percentages of BeO, say about 5%, the CaO and SrO contents may be as high as 60%. In addition to its ability to raise the refractive index without substantially increasing the dispersive power of the glass, BeO has a beneficial effect on its chemical durability and its resistance to devitrification.

Various other oxides may be introduced into the glass with beneficial effect on the refractive index and nu value. The oxides of barium, cadmium and lead are useful for raising the refractive index. BaO in too large amounts tends to cause crystallization of the glass and should not exceed about 60%. Excessive amounts of PbO cause an objectionable increase in the dispersive power of the glass, that is, a lowering of nu value. Hence the content of PbO preferably should not exceed about 20%. No difficulty is experienced with CdO in amounts up to about 60%. Although less effective for raising the refractive index, MgO and ZnO may be used if desired. MgO in excess of about 30% causes crystallization and ZnO should not exceed about 60% for the same reason.

Oxides of the metals of the zirconium subgroup of the fourth periodic group, $ZrO_2$, $HfO_2$ and $ThO_2$, may also be employed. $ZrO_2$ is particularly desirable because it causes an increase in refractive index without objectionable decrease in nu value. Up to 11% $ZrO_2$ may be used, but the amount which the glass will dissolve decreases as the content of CaO and SrO is increased beyond about 30%. $ThO_2$ and $HfO_2$ may likewise be employed in amounts up to 11% in lieu of $ZrO_2$ and with substantially the same effect. The greater cost of $ThO_2$ and $HfO_2$, however, makes them less desirable. These oxides improve the chemical durability of the glass. $TiO_2$ causes an objectionable lowering of the nu value.

The presence of alumina in general is not desirable, because it decreases the solubility of $ZrO_2$ and $ThO_2$. It also tends to increase the dispersive power of the glass, that is, to lower its nu value and it should preferably be omitted except when its presence may be desirable to prevent crystallization.

With the exception of lithia, the alkali metal oxides cause an objectionable increase in the dispersive power of the glass. Including lithia, they tend to lower the chemical durability of the glass. Since the new glasses in general melt readily without additional fluxes, the alkali metal oxides should preferably be omitted but can be used with advantage for adjusting the thermal expansion coefficient and softness of the glass and for other purposes.

The oxides of antimony and bismuth affect the optical properties of the new glasses in a manner similar to the effect of lead oxide. They may be employed in amounts up to about 20% $Sb_2O_3$ or 20% $Bi_2O_3$.

The following compositions in percent by weight as calculated from their batches illustrate the glasses of this invention:

|  | A | B | C | D | E | F | G | H |
|---|---|---|---|---|---|---|---|---|
| $SiO_2$ | 20 | 20 | 20 | 5 | 15 | 15 | 15 | 13.6 |
| $B_2O_3$ | 20 | 20 | 20 | 30 | 15 | 15 | 15 | 13.6 |
| BeO | 10 | 5 | 5 | 7.5 | 5 | 5 | 5 | 4.6 |
| CaO | 50 | 55 | 50 | 15 | 25 | 25 | 20 | 22.7 |
| SrO |  |  |  | 15 |  |  |  |  |
| $ZrO_2$ |  |  | 5 | 7.5 |  | 5 | 5 |  |
| BaO |  |  |  | 20 | 40 | 35 | 30 | 36.4 |
| PbO |  |  |  |  |  |  | 10 | 9.1 |
| nD | 1.6453 | 1.6471 | 1.6559 | 1.6572 | 1.6635 | 1.6766 | 1.6924 | 1.6927 |
| ν | 56.3 | 55.1 | 54.0 | 54.6 | 53.5 | 51.9 | 46.4 | 46.0 |

|  | J | K | L | M | N |
|---|---|---|---|---|---|
| $SiO_2$ | 15 | 15 | 13.5 | 12.5 | 15 |
| $B_2O_3$ | 15 | 15 | 13.5 | 15 | 15 |
| BeO | 5 | 5 | 4 | 5 | 5 |
| CaO | 20 | 20 | 20 | 20 | 20 |
| $ZrO_2$ | 4 | 5 | 4 | 5 | 5 |
| BaO | 16 | 15 | 30 | 15 |  |
| PbO |  | 5 | 15 |  |  |
| CdO | 25 | 20 |  | 27.5 | 40 |
| nD | 1.7000 | 1.7071 | 1.7093 | 1.7138 | 1.7169 |
| ν | 48.0 | 45.4 | 42.8 | 46.0 | 45.3 |

The above glasses do not crystallize under the usual conditions of melting and remolding and they have very good chemical durability. It will be noted that they are free from alumina and alkali metal oxides. It will also be noted that their nu values are relatively high in proportion to their refractive indices. They are adapted for use with flint glasses of lower refractive index to form optical systems of the anomalous achromatic type. Example J is particularly suitable for combination with a flint glass having the optical properties $nD=1.5263$, $\nu=51.0$. Substantially the same optical properties as those of Example J can be obtained in glasses containing 10% to 20% $SiO_2$, 10% to 20% $B_2O_3$, about 5% BeO, about 20% CaO, not over about 5% $ZrO_2$, 5% to 35% BaO, and 5% to 35% CdO, the total BaO and CdO not exceeding about 45%.

To illustrate the relationship between nD and ν for the glasses of this invention as compared with prior glasses, reference is had to the accompanying drawing which is a graph representing the value of nD for the above examples plotted against their respective nu values and designated by the letters of the respective glasses. It will be noted that the values for the various glasses are above line X which represents the approximate minima in the values for nD and ν which characterize the glasses of this invention and which bounds the upper limit of the field of conventional optical glasses made from the common glass making materials.

The line X is drawn through the points ($nD=1.62$, $\nu=60$) and ($nD=1.70$, $\nu=42$) and is defined by the equation ($\nu=431-229nD$).

I claim:

1. A substantially colorless optical glass consisting of ingredients compatible in glass and comprising 10% to 20% $SiO_2$, 10% to 20% $B_2O_3$, 5% BeO, 20% CaO, up to 5% $ZrO_2$, 5% to 35% BaO, and 5% to 35% CdO, the total of the percentages of BaO and CdO being between 30% and 45%, the refractive index (nD) being at least 1.67 and the dispersive index (ν) being greater than $\nu=431-229nD$.

2. A substantially colorless optical glass which consists approximately of 15% $SiO_2$, 15% $B_2O_3$, 5% BeO, 20% CaO, 4% $ZrO_2$, 16% BaO and 25% CdO.

3. A substantially colorless titanium-free optical glass consisting of ingredients compatible in glass and comprising 5% to 40% $SiO_2$, 5% to 40% $B_2O_3$ and at least two divalent metal oxides in the indicated proportions selected from the group consisting of 2% to 15% BeO, up to 30% MgO, 10% to 60% CaO, up to 60% ZnO, 10% to 60% SrO, 10% to 60% of a mixture of CaO and SrO, up to 60% CdO, up to 60% BaO, and up to 20% PbO, the selected divalent metal oxides including BeO and an oxide selected from the group consisting of CaO, SrO, and a mixture of CaO and SrO in the above-indicated proportions, the total of said divalent metal oxides being between 55% and 80%, said glass having a refractive index (nD) of at least 1.635 and a dispersive index (ν) greater than $\nu=431-229nD$.

4. A substantially colorless titanium-free optical glass consisting of ingredients compatible in glass and comprising 5% to 40% $SiO_2$, 5% to 40% $B_2O_3$ and at least two divalent metal oxides in the indicated proportions selected from the group consisting of 2% to 15% BeO, up to 30% MgO, 10% to 60% CaO, up to 60% ZnO, 10% to 60% SrO, 10% to 60% of a mixture of CaO and SrO, up to 60% CdO, up to 60% BaO, and up to 20% PbO, the selected divalent metal oxides including BeO and CaO in the above-indicated proportions, the total of said divalent metal oxides being between 55% and 80%, said glass having a refractive index (nD) of at least 1.635 and a dispersive index (ν) greater than $\nu=431-229nD$.

5. A substantially colorless optical glass consisting of ingredients compatible in glass and comprising 5% to 40% $SiO_2$, 5% to 40% $B_2O_3$, at least two divalent metal oxides in the indicated proportions selected from the group consisting of 2% to 15% BeO, up to 30% MgO, 10% to 60% CaO, up to 60% ZnO, 10% to 60% SrO, 10% to 60% of a mixture of CaO and SrO, up to 60% CdO, up to 60% BaO, and up to 20% PbO, the selected divalent metal oxides including BeO and an oxide selected from the group consisting of CaO, SrO, and a mixture of CaO and SrO in the above-indicated proportions, the total of said divalent metal oxides being between 55% and 80%, and up to 11% $ZrO_2$, said glass having a refractive index ($nD$) of at least 1.635 and a dispersive index ($\nu$) greater than $\nu=431-229nD$.

6. A substantially colorless titanium-free optical glass consisting of ingredients compatible in glass and comprising 5% to 40% $SiO_2$, 5% to 40% $B_2O_3$ and at least three divalent metal oxides in the indicated proportions selected from the group consisting of 2% to 15% BeO, up to 30% MgO, 10% to 60% CaO, up to 60% ZnO, 10% to 60% SrO, 10% to 60% of a mixture of CaO and SrO, up to 60% CdO, up to 60% BaO, and up to 20% PbO, the selected divalent metal oxides including BeO, and oxide selected from the group consisting of CdO, BaO, and PbO, and an oxide selected from the group consisting of CaO, SrO, and a mixture of CaO and SrO in the above-indicated proportions, the total of said divalent metal oxides being 55% to 80%, said glass having a refractive index ($nD$) of at least 1.635 and a dispersive index ($\nu$) greater than $\nu=431-229nD$.

7. A substantially colorless optical glass consisting of ingredients compatible in glass and comprising 5% to 40% $SiO_2$, 5% to 40% $B_2O_3$, at least three divalent metal oxides in the indicated proportions selected from the group consisting of 2% to 15% BeO, up to 30% MgO, 10% to 60% CaO, up to 60% ZnO, 10% to 60% SrO, 10% to 60% of a mixture of CaO and SrO, up to 60% CdO, up to 60% BaO, and up to 20% PbO, the selected divalent metal oxides including BeO, an oxide selected from the group consisting of CdO, BaO, and PbO, and an oxide selected from the group consisting of CaO, SrO, and a mixture of CaO and SrO in the above-indicated proportions, the total of said divalent metal oxides being 55% to 80%, and up to 11% $ZrO_2$, said glass having a refractive index ($nD$) of at least 1.635 and a dispersive index ($\nu$) greater than $\nu=431-229nD$.

8. A substantially colorless optical glass consisting of ingredients compatible in glass and comprising 10% to 20% $SiO_2$, 10% to 20% $B_2O_3$, at least two divalent metal oxides in the indicated proportions selected from the group consisting of 3% to 8% BeO, up to 30% MgO, 10% to 60% CaO, up to 60% ZnO, 10% to 60% SrO, 10% to 60% of a mixture of CaO and SrO, up to 60% CdO, up to 60% BaO, and up to 20% PbO, the selected divalent metal oxides including BeO and an oxide selected from the group consisting of CaO, SrO, and a mixture of CaO and SrO in the above-indicated proportions, the total of said divalent metal oxides being between 57% and 77%, and 3% to 8% $ZrO_2$, said glass having a refractive index ($nD$) of at least 1.67 and a dispersive index ($\nu$) greater than $\nu=431-229nD$.

9. A substantially colorless optical glass consisting of ingredients compatible in glass and comprising 10% to 20% $SiO_2$, 10% to 20% $B_2O_3$, at least three divalent metal oxides in the indicated proportions selected from the group consisting of 3% to 8% BeO up to 30% MgO, 10% to 60% CaO up to 60% ZnO, 10% to 60% SrO, 10% to 60% of a mixture of CaO and SrO, up to 60% CdO, up to 60% BaO, and up to 20% PbO, the selected divalent metal oxides including BeO, an oxide selected from the group consisting of CdO, BaO, and PbO, and an oxide selected from the group consisting of CaO, SrO, and a mixture of CaO and SrO in the above-indicated proportions, the total of said divalent metal oxides being between 57% and 77%, and 3% to 8% $ZrO_2$, said glass having a refractive index ($nD$) of at least 1.67 and a dispersive index ($\nu$) greater than $\nu=431-229nD$.

10. A substantially colorless titanium-free optical glass consisting of ingredients compatible in glass and comprising 5% to 40% $SiO_2$, 5% to 40% $B_2O_3$, at least two divalent metal oxides in the indicated proportions selected from the group consisting of 2% to 15% BeO, up to 30% MgO, 10% to 60% CaO, up to 60% ZnO, 10% to 60% SrO, 10% to 60% of a mixture of CaO and SrO, up to 60% CdO, up to 60% BaO, and up to 20% PbO, the selected divalent metal oxides including BeO and an oxide selected from the group consisting of CaO, SrO, and a mixture of CaO and SrO in the above-indicated proportions, the total divalent metal oxides being between 55% and 80%, and up to 20% of an oxide selected from the group consisting of $Sb_2O_3$, $Bi_2O_3$ and a mixture of $Sb_2O_3$ and $Bi_2O_3$, said glass having a refractive index ($nD$) of at least 1.635 and a dispersive index ($\nu$) greater than $\nu=431-229nD$.

11. A substantially colorless titanium-free optical glass consisting of ingredients compatible in glass and comprising 5% to 40% $SiO_2$, 5% to 40% $B_2O_3$, at least two divalent metal oxides in the indicated proportions selected from the group consisting of 2% to 15% BeO, up to 30% MgO, 10% to 60% CaO, up to 60% ZnO, 10% to 60% SrO, 10% to 60% of a mixture of CaO and SrO, up to 60% CdO, up to 60% BaO, and up to 20% PbO, the selected divalent metal oxides including BeO and an oxide selected from the group consisting of CaO, SrO, and a mixture of CaO and SrO in the above-indicated proportions, the total divalent metal oxides being between 55% and 80%, up to 11% $ZrO_2$, and up to 20% of an oxide selected from the group consisting of $Sb_2O_3$, $Bi_2O_3$ and a mixture of $Sb_2O_3$ and $Bi_2O_3$, said glass having a refractive index ($nD$) of at least 1.635 and a dispersive index ($\nu$) greater than $\nu=431=229nD$.

WILLIAM H. ARMISTEAD.

REFERENCES CITED

The following references are of record in the file of this patent:

UNITED STATES PATENTS

| Number | Name | Date |
|---|---|---|
| 576,896 | Rudolph | Feb. 9, 1897 |
| 2,321,973 | Bennett | June 15, 1943 |
| 2,406,580 | Bostick et al. | Aug. 27, 1946 |

FOREIGN PATENTS

| Number | Country | Date |
|---|---|---|
| 388,118 | Great Britain | 1933 |

OTHER REFERENCES

Ordnance Dept. Document No. 2037, May 1921—table 4, pp. 59, 60, 61, 62.